United States Patent [19]
Innes et al.

[11] Patent Number: 5,684,342
[45] Date of Patent: Nov. 4, 1997

[54] STARTER WITH OVERLOAD RELAY HAVING POWER OFF COOLING FOR MULTIPLE CLASS LOADS

[75] Inventors: Mark Edmund Innes, Asheville; Michael G. Early, Hendersonville, both of N.C.

[73] Assignee: Eaton Corporation, Cleveland, Ohio

[21] Appl. No.: 559,053

[22] Filed: Nov. 16, 1995

[51] Int. Cl.$^6$ ..................................................... H01H 35/00
[52] U.S. Cl. .................. 307/117; 307/125; 307/139; 361/24; 361/28; 361/23
[58] Field of Search ..................................... 361/23, 24, 25, 361/28, 29, 30, 31; 307/112, 116, 117, 125, 139, 140, 141, 141.4; 364/481, 492

[56] References Cited

U.S. PATENT DOCUMENTS

| | | | |
|---|---|---|---|
| 4,796,142 | 1/1989 | Libert | 361/23 |
| 5,303,160 | 4/1994 | Winter et al | 364/481 |
| 5,539,601 | 7/1996 | Farag et al. | 361/23 |
| 5,579,194 | 11/1996 | Mackenzie et al. | 361/24 |

Primary Examiner—William M. Shoop, Jr.
Assistant Examiner—Jonathan S. Kaplan
Attorney, Agent, or Firm—Larry G. Vande Zande

[57] ABSTRACT

A starter comprising a contactor with an overcurrent relay provides an appropriate cooling interval for each of multiple classes of a load, such as a motor. An analog equivalent of a digital $I^2t$ value calculated by a microcomputer in the overload relay is maintained by an external capacitor. When the microcomputer loses power following a trip, the capacitor discharges through a resistor at a rate selected to mimic cooling of the associated class of the load. Restart of the load is prevented until the appropriate interval, represented by the time required for the voltage on the capacitor to decay to a common reset value, has expired. The capacitor is charged to a voltage proportional to the $I^2t$ trip value for the particular class of the load, which for all classes is below the forward drop of the clamping diodes on the microcomputer inputs to prevent discontinuities in the timing.

5 Claims, 3 Drawing Sheets

STARTER WITH OVERLOAD RELAY HAVING POWER OFF COOLING FOR MULTIPLE CLASS LOADS

BACKGROUND OF THE INVENTION

1. Field of the Invention

This invention relates to a starter having an overload relay which opens the starter contacts if load current exceeds predetermined current/time values, and which prevents restarting of the load for an interval sufficient to permit the load to cool. More particularly, it relates to such a starter having an overload relay with proper power off cooling for multiple class loads.

2. Background Information

A common type of starter for loads such as motors, lighting, and the like, comprises an electromagnetic contactor with an overload relay. The overload relay monitors the load current and trips the contactor open if a persistent overcurrent condition exists. Typically, the overload relay tracks an $I^2t$ characteristic of the load current which is a measure of heating.

Today, it is common for the overload relay to contain a microprocessor which digitally generates the $I^2t$ value. When the calculated $I^2t$ value reaches a trip level, the contactor is tripped open to interrupt the flow of current to the load.

It is desirable not to restart the load until it has cooled to a satisfactory temperature. When the microprocessor is powered by an independent power source, cooling can be simulated digitally and restarting of the load can be enabled when the simulated cooling indicates that a satisfactory temperature has been reached. However, some starters are energized by power derived from the load current, and are therefore, deenergized when the contactor is tripped open. Thus, the microprocessor can not digitally track the cooling, and in most cases the accumulated $I^2t$ value is lost. A solution to this problem has been to generate an analog equivalent of the digitally calculated $I^2t$ value such as by charging a capacitor to a voltage corresponding to the calculated $I^2t$ value. When the microprocessor is deenergized, the voltage on the capacitor is discharged through a shunt resistor having a value selected along with the value of the capacitor so that the voltage on the capacitor decays at a rate which mimics cooling of the load. When the microprocessor is repowered, the voltage on the capacitor is read and used as the initial value for the digital $I^2t$ value. However, restarting of the load is prevented until the $I^2t$ value has reached the desired level. While this arrangement works well for a given load, the starter can be used for many different loads which typically have different characteristics. For example, electric motors are classified according to the amount of energy they can absorb, and therefore, the interval over which they can tolerate a given overcurrent. The motor which will tolerate the given overcurrent for a longer duration will therefore also require more time to dissipate that energy by cooling down following a trip.

At the present, the overload relays in motor starters typically track the $I^2t$ characteristic as a percentage of the trip value. Such overload relays can then provide an easily understood presentation of the state of the motor relative to a trip. Thus, when the overload relay trips the $I^2t$ value is 100% of the trip value regardless of the class of the motor. Presently, the external capacitor is charged to a voltage proportional to the percentage of the trip value represented by the calculated $I^2t$ value. With the same voltage applied to the external capacitor when a motor of any class trips, the voltage on the capacitor will decay at the same rate for all classes of motors. Typically, the $I^2t$ characteristic must decay to about ½ of the trip value before the motor is permitted to be restarted. Since the same voltage is applied to the capacitor for each class of motor, this voltage decays to 50% of its initial value in the same amount of time regardless of the class of motor. It is common therefore, to set the 100% trip value on the capacitor to provide a suitable cooling for an intermediate class motor. This provides somewhat extended cooling for a lower class of motor and slight undercooling for higher class of motors, but in general provides adequate cooling.

There is a need therefore, for an improved starter with an overload relay which is adaptable for use with a range of loads, and particularly multiple classes of motors.

There is a particular need for such an improved starter having a digital overload relay with an external capacitor which mimics motor cooling when the overload relay trips the starter open and the microprocessor becomes deenergized.

There is a further need for such an improved starter with such a digital overload relay which prevents a restart of the load following a trip for an interval particularly appropriated for the class of the load.

SUMMARY OF THE INVENTION

These needs and others are satisfied by the invention which is directed to apparatus adapted for connecting any one of a plurality of classes of a load to an electric power source and providing overload protection therefor. The apparatus includes digital control means for generating a digitally modeled heat state signal and for interrupting current to the load when the digitally modeled heat state signal reaches a predetermined trip value, wherein each of the classes of the load have a different trip value and have a different associated cooling time for the load to cool to a reset value following a trip. The apparatus further includes analog means storing an analog equivalent of the digitally modeled heat state signal and means decaying the analog heat state signal at a rate mimicking cooling of the load when current to the load is interrupted. The digital control means also includes means responsive to the analog heat state signal as decayed which prevent reenergizing the load until the heat state signal decays to a predetermined common absolute value for all classes of the load. The predetermined trip value of the digitally modeled heat state signal is selected so that the analog heat state signal for each class of the load decays to the common absolute value in the associated cooling time for the associated class.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENT

The invention will be described as applied to a motor starter adapted for use with multiple classes of motors.

However, it will be appreciated by those skilled in the art that the invention has application to other types of switching devices for connecting a plurality of classes of loads to an electric power source and providing overload protection for such loads.

Figure 1:
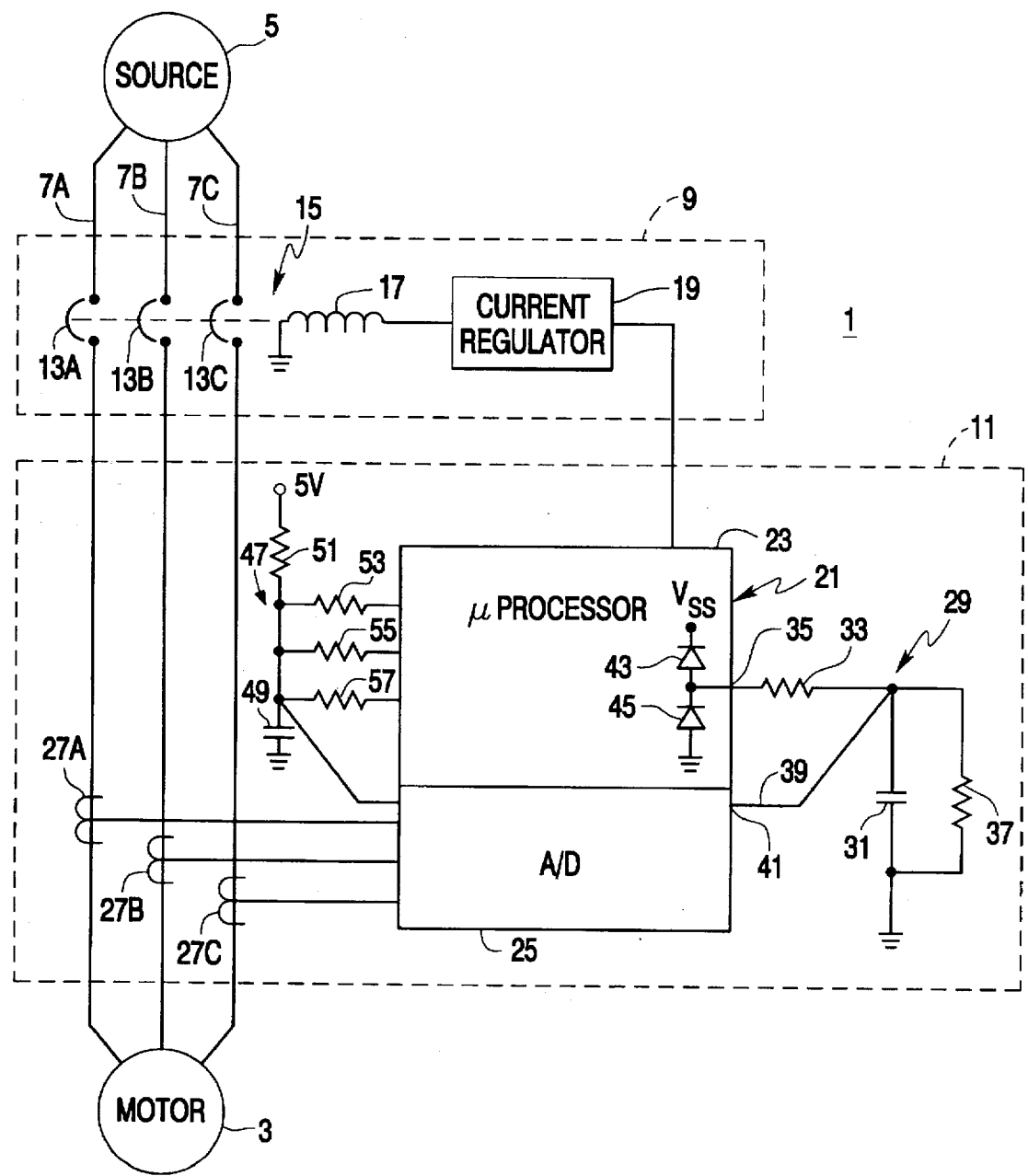
FIG. 1 is the schematic diagram of a motor starter incorporating the invention.

Referring to FIG. 1, an exemplary motor starter 1 controls energization of a motor 3 by a three phase electrical source 5 having electrical conductors 7A, 7B and 7C. The motor starter 1 can be used with motors 3 of a number of different classes such classes 10, 20 and 30. As discussed above, these different classes of motors 3 have different capabilities of absorbing energy which are accommodated for by the motor starter of the invention.

The motor starter 1 is preferably of the type disclosed in U.S. Pat. No. 5,303,160 which is hereby incorporated by reference. Such a motor starter 1 includes a contactor 9 and an overload relay 11. The contactor 9 includes separable contacts 13A, 13B and 13C connected in the electrical conductors 7A, 7B and 7C, respectively. The separable contacts are mounted on the armature of an electromagnet 15 having a coil 17. The coil 17 is energized to close the separable contacts 13 thereby connecting the motor 3 to the source 5 by a current regulator 19 controlled by the overload relay 11.

The overload relay 11 includes a microcomputer 21 which in turn includes a microprocessor 23 and an analog to digital (A/D) converter 25. The microcomputer 21 monitors the three phase currents in the conductors 7A, 7B and 7C through current transformers 27A, 27B and 27C. The analog currents measured by the CTs 27 are digitized by the A/D converter 25 for input to the microprocessor 23. The microprocessor 23 implements a selected current/time protection function such as an $I^2t$ function, using the measured currents provided by the CTs 27, as is well known. If the current/time protection parameters are exceeded, the microprocessor 23 trips the contactor 9 to open the separable contacts 13 by turning off the current regulator 19.

The $I^2t$ characteristic generated by the microprocessor 23 is a digitally modeled representation of the heat state of the motor 3. Once the overload relay trips the contactor open, the load begins to cook However, in some motor starters, the microcomputer 21 of the overload relay 11 is deenergized when the contactor is open. For instance, in the exemplary motor starter, the overload relay 11 is energized through the CTs 27 which are on the load side of the contactor and, therefore, lose power when the contactor is open. As mentioned, the motor 3 should be permitted to cool to a suitable level before an attempt is made to restart it. As the microcomputer 21 is unable to track motor cooling since it is deenergized following a trip, it is known to generate an analog equivalent of the digitally modeled heat state signal which then mimics cooling of the motor. The circuit 29 in FIG. 1 provides this analog equivalent of the digitally modeled heat state signal. The circuit 29 includes a capacitor 31 which is charged through a resistor 33 by a port 35 on the microprocessor 23. A shunt resistor 37 bleeds the capacitor 31 at a rate which mimics cooling of the load. The microcomputer 23 provides a pulse width modulated signal at the port 35 which adjusts the voltage on the capacitor 31 to track the digitally modeled heat state signal generated by the microprocessor while it is energized. The voltage on the capacitor is fed back to the microprocessor 23 over a lead 39 connected to the input 41 of the A/D converter 25.

The port 35 to the microprocessor 23 is typically damped by a diode 43 which limits the voltage on the output to the value of the supply voltage $V_{ss}$, typically 5 volts, plus the forward drop of the diode. Negative voltage at port 35 is limited to the forward drop of the diode 45. Thus, normally the voltage on the output 35 can vary from about plus 5 volts to slightly negative. However, when the microcomputer 21 is deenergized, such as following a trip, the capacitor 31 discharges rapidly through the diode 43 down to the forward drop of this diode. Thus, if a voltage on capacitor 31 above the forward drop of the diode 43 is used to represent the analog equivalent of the digitally modeled heat state signal, there would be a discontinuity in this signal when the microcomputer 21 loses power. Therefore, the voltage on the capacitor 31 used as the analog equivalent of the digitally modeled heat state signal must not exceed the forward drop of the diode 43 which is typically about 0.65 volts.

The voltage on the capacitor 31 decays exponentially with time to mimic cooling of the deenergized motor 3. Thus, depending upon the values of the capacitor 31 and resistor 37, and the initial voltage on the capacitor 31, the voltage can be made to decay to a given value within a given time following a trip thereby providing a selected motor cooling period. As mentioned, in the prior art motor starters, the capacitor 31 is charged to the same value at the time of trip for all classes of motors. As the restart is inhibited until the voltage has decayed to a common value, the same cooling period is provided for all classes of motors.

In accordance with the present invention, the voltage to which the capacitor 31 is charged at the time of the trip is dependent upon the class of the motor. Restart of the motor is inhibited until the voltage on the capacitor has fallen to a absolute value common for all of the included classes of motors. This provides an appropriate cooling time for each class of the motor. One of the problems associated with this solution is the limitation that the voltage V on the capacitor 31 cannot exceed the forward drop of the diode 43, yet sufficient range must be provided for the initial value $V_1$ of this voltage V to cover all of the classes of motors to be accommodated by the motor starter. The voltage, V, on the capacitor 31 with the microcomputer 21 deenergized is:

$$V = V_1 e^{-\frac{t}{RC}}$$

By way of example, with R, the value of the shunt resistor 37, equal to 20M and a capacitance C, of capacitor 31 of $10^{-6}$, the time constant RC would be about 200 seconds. In the exemplary overcurrent relay, a set point voltage of 39 mV is used as the common value for enabling restart of the motor. For a class 30 motor, a cooling time of 2 minutes and 18 seconds is provided by setting $V_1$, the voltage on the capacitor 31 at trip, to 78 mV. For a class 20 motor, a reset time of 4 minutes and 30 seconds is provided by setting the initial voltage, $V_1$, to 150 mV. For class 30, a reset time of six minutes and 45 second is achieved by setting $V_1$ to 300 nV. Thus, a range of 4 to 1 for the initial voltage is provided below the forward drop of the clamping diodes.

The digitally modeled heat state signal generated by the microprocessor 23 is normalized to the selected trip value so that a percentage of the trip value can be output to advise the user of how close the motor is to a trip condition. This normalized digital heat state signal must be converted by an appropriate conversion factor so that at 100% trip value, the voltage $V_1$ on the capacitor 31 is set to the appropriate value for the selected class. Reference values for these conversion factors are provided by the circuit 47. This circuit includes a capacitor 49 charged by a 5 volt supply through a resistor 51. The voltage on the capacitor 49 is selected by the microprocessor 23 by grounding one of three resistors 53, 55 and 57. The grounded one of these resistors forms a voltage divider with the resistor 51 which determines the reference voltage on the capacitor 49 which in turn is read by the A/D converter 25.

Figure 2:
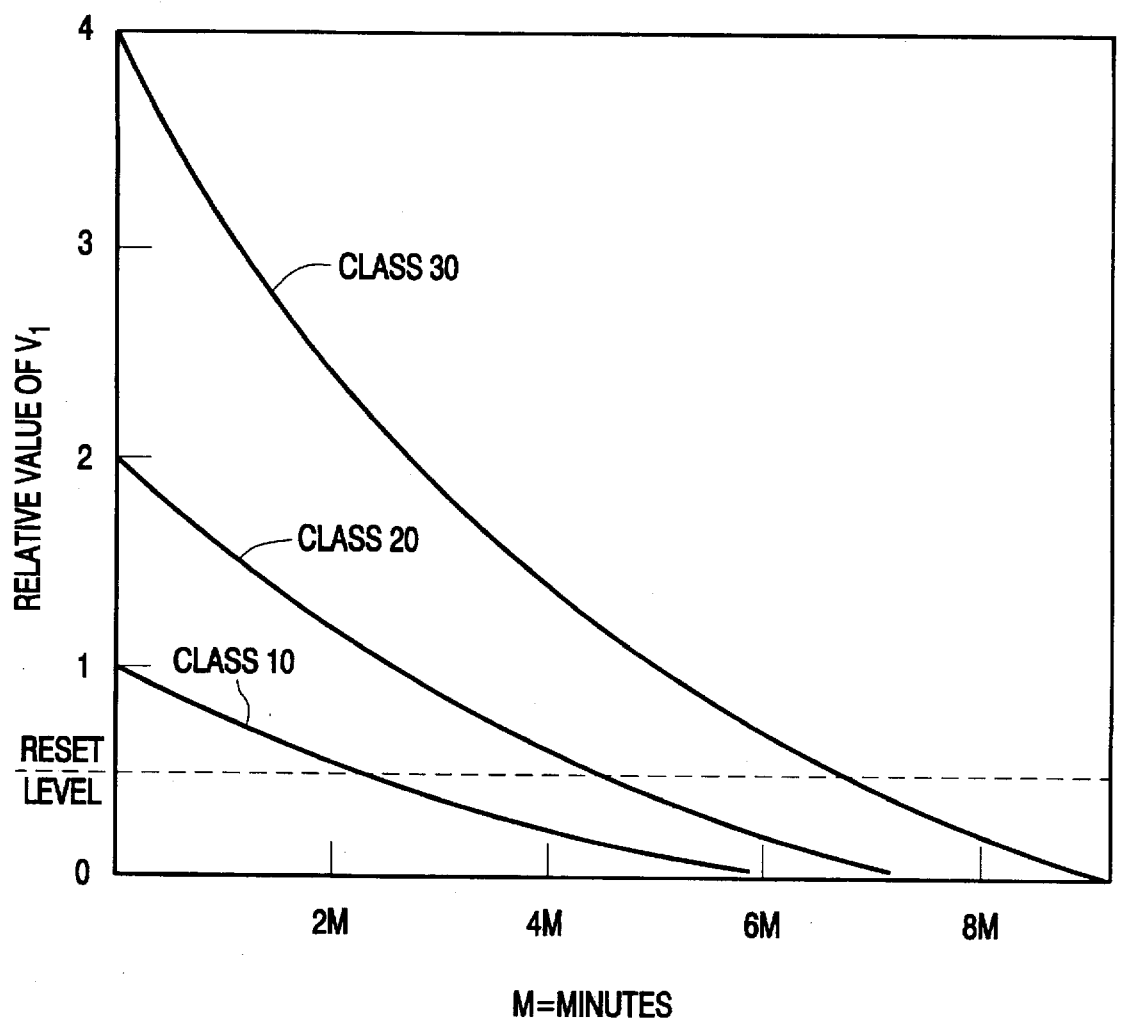
FIG. 2 is a flow chart of a computer program utilized by the motor starter of FIG. 1 to implement the invention.

FIG. 2 illustrates graphically the operation of the motor starter in accordance with the invention. As can be seen, for a class 10 motor the 100% trip value for the voltage $V_1$ is set to a relative value 1 which decays to the common reset level in about two minutes. On the other hand, for a class 20 motor, the relative value of $V_1$ is set to 2 so that the reset level is reached in about 4 minutes and 30 seconds. Similarly, voltage $V_1$ for a class 30 motor is set to a relative value at 4 at trip so that the common reset level is reached in about 6 minutes and 45 seconds.

Figure 3:
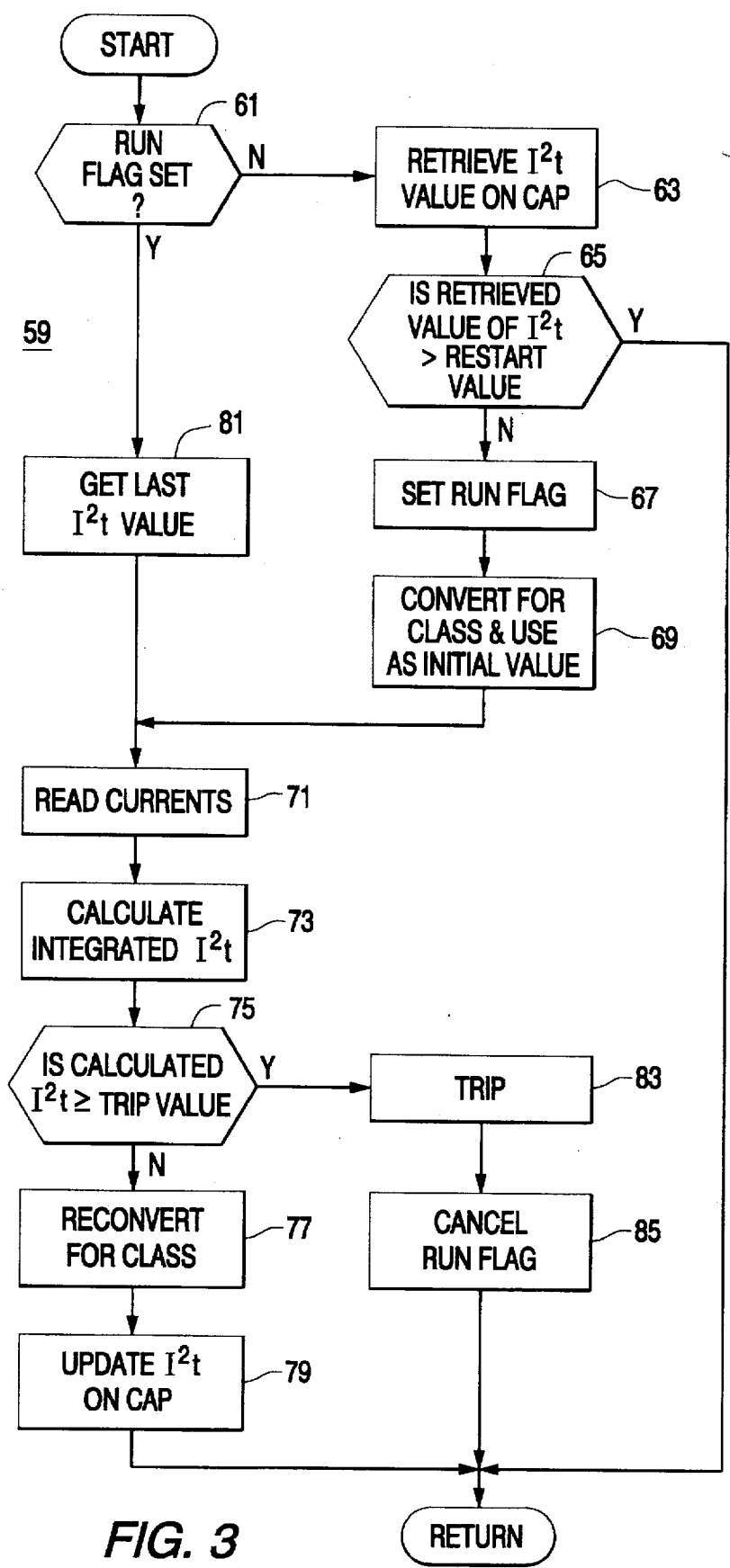
FIG. 3 is a plot illustrating application of the invention to provide power off cooling for multiple class motors.

FIG. 3 illustrates a flow chart for a routine 59 which is periodically run by the microprocessor 23 in response to a time interrupt. If a run flag is not set at 61, the analog heat state signal on the capacitor is retrieved at 63. If the retrieved value of the analog heat state signal is above the restart value as determined at 65, the program is exited. When the retrieved analog heat state signal falls below the reset value at 65, a run flag is set at 67 and the retrieved voltage is converted for the selected motor class and used as an initial value for $I^2t$ at 69. The currents are then read at 71 and the new value for the current/time characteristic is calculated at 73. Since this is the first time through the routine since the analog heat state signal fell below the reset value, the new value of $I^2t$ would not exceed the trip value at 75. Under these circumstances, the new value for $I^2t$ would be converted for the selected class of motor at 77 and the voltage on the capacitor 31 is correspondingly updated at the 79.

On the next run through the routine 59, the run flag will be set at 61 and, therefore, the most recent value of $I^2t$ will be retrieved at 81. This value of the current/time characteristic will be updated at 73 by the latest currents read at 71. As long as the current/time characteristic does not exceed the trip value, the voltage on the capacitor will track the digital heat state signal as indicated at 77 and 79. If the tripped value is exceeded at 75, the contactor is tripped at 83 and the run flag is cancelled at 85.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. Apparatus for connecting any one of a plurality of classes of a load to an electric power source and providing overload protection therefore, said apparatus comprising:

separable contacts connecting a selected load from said plurality of classes of a load to said electric power source when closed and interrupting current to said selected load when open;

digital control means responsive to current supplied to said selected load from said electric power source when said separable contacts are closed for generating a digitally modeled heat state signal and opening the separable contacts to interrupt current to the said selected load when said digitally modeled heat state signal reaches a predetermined value, each of said plurality of said classes of a load having a different predetermined value and a different associated cooling time for cooling to a reset value after current is interrupted; and analog means storing an analog heat state signal equivalent to the digitally modeled heat state signal and including means decaying said analog heat state signal at a rate mimicking cooling of said selected load when said separable contacts are open and current to said selected load is interrupted;

said digital control means including means responsive to said analog heat state signal as decayed by such analog means, preventing a reclosing of said separable contacts until said analog heat state signal decays to a predetermined common reset value for all of said plurality of classes of a load, said predetermined value of said digitally modeled heat state signal being selected such that said analog heat state signal for each class of said plurality of classes decays to said predetermined common reset value in said associated cooling time.

2. Apparatus as claimed in claim 1 wherein said analog storage means comprises a capacitor and said digital control means comprises a microcomputer having a port with clamping diodes having a predetermined forward drop and charging means charging said capacitor to an analog voltage equivalent of said predetermined value of said digitally modeled heat state signal which for all of said plurality of classes of a load is below said predetermined forward drop of said clamping diodes.

3. Apparatus as claimed in claim 2 wherein said charging means comprises means charging said capacitor to an analog voltage equivalent of said digitally modeled heat state signal which varies over a range of at least 4:1 for said plurality of classes of a load but is below said predetermined forward drop.

4. Apparatus as claimed in claim 1 wherein said digital control means comprises means for generating a normalized digitally modeled heat state signal and means converting said normalized digitally modeled heat state signal to a class specific digital heat state signal and wherein said analog means stores and decays an analog heat state signal equivalent to said class specific digital heat state signal.

5. Apparatus as claimed in claim 4 wherein said digital control means comprises means converting said analog heat state signal equivalent to said class specific digital heat state signal as decayed to a normalized initial digital heat state signal following restart of said selected load.

* * * * *